(12) United States Patent
Sugrue et al.

(10) Patent No.: US 8,472,687 B2
(45) Date of Patent: Jun. 25, 2013

(54) ELECTRONIC CLEANSING OF DIGITAL DATA SETS

(75) Inventors: Mark Brendan Sugrue, Limerick (IE); Paul Francis Whelan, Dublin (IE); Kevin Peter Robinson, Dublin (IE); Tarik Ahmed Chowdhury, Dublin (IE)

(73) Assignee: Dublin City University, Dublin (IE)

( * ) Notice: Subject to any disclaimer, the term of this patent is extended or adjusted under 35 U.S.C. 154(b) by 261 days.

(21) Appl. No.: 12/994,855

(22) PCT Filed: May 28, 2009

(86) PCT No.: PCT/EP2009/056580
§ 371 (c)(1), (2), (4) Date: Dec. 17, 2010

(87) PCT Pub. No.: WO2009/144290
PCT Pub. Date: Dec. 3, 2009

(65) Prior Publication Data
US 2011/0135180 A1 Jun. 9, 2011

(30) Foreign Application Priority Data

May 28, 2008 (GB) .................................. 0809616.6

(51) Int. Cl.
*G06K 9/00* (2006.01)

(52) U.S. Cl.
USPC ............................... 382/128; 128/922; 378/4

(58) Field of Classification Search
USPC .. 382/100, 128, 129, 130, 131, 132; 128/922; 378/4–27
See application file for complete search history.

(56) References Cited

U.S. PATENT DOCUMENTS

| | | | |
|---|---|---|---|
| 6,331,116 B1 | 12/2001 | Kaufman et al. | |
| 6,343,936 B1 * | 2/2002 | Kaufman et al. | 434/262 |
| 6,477,401 B1 | 11/2002 | Johnson et al. | |
| 6,514,082 B2 | 2/2003 | Kaufman et al. | |
| 7,454,044 B2 * | 11/2008 | Truyen et al. | 382/128 |
| 7,583,831 B2 * | 9/2009 | Tu et al. | 382/131 |
| 7,809,177 B2 * | 10/2010 | Yoshida et al. | 382/128 |
| 7,853,310 B2 * | 12/2010 | Vining et al. | 600/425 |

(Continued)

FOREIGN PATENT DOCUMENTS

| | | |
|---|---|---|
| WO | 01/69539 A2 | 9/2001 |
| WO | 2006/023152 A1 | 3/2006 |

(Continued)

OTHER PUBLICATIONS

Search Report of foreign counterpart Application No. GB0809616.6 dated Sep. 4, 2008.

(Continued)

*Primary Examiner* — Anand Bhatnagar
(74) *Attorney, Agent, or Firm* — Summa, Additon & Ashe, P.A.

(57) ABSTRACT

A method of processing a 3-dimensional Computed Tomography Colonography data set to remove tagged material is disclosed. The method involves the preliminary processing step of classifying voxels in the data set as corresponding to air, tagged material or colon tissue. Methods of overcoming erroneous classification of Partial Volume air/tagged material interface voxels are disclosed. The present invention also provides for methods of circumventing problems resulting from removal of tagged material from a CTC data set, which can result in the erosion of soft-tissue structures partially covered by tagged colonic fluid.

19 Claims, 6 Drawing Sheets

U.S. PATENT DOCUMENTS

| | | | |
|---|---|---|---|
| 8,131,036 B2* | 3/2012 | Collins et al. | 382/128 |
| 2006/0143215 A1* | 6/2006 | Truyen et al. | 707/102 |
| 2007/0073114 A1 | 3/2007 | Gundel | |
| 2007/0127804 A1* | 6/2007 | Yoshida et al. | 382/131 |

FOREIGN PATENT DOCUMENTS

| | | |
|---|---|---|
| WO | 2007/030132 A2 | 3/2007 |
| WO | 2007/048091 A2 | 4/2007 |
| WO | 2007/064980 A2 | 6/2007 |

OTHER PUBLICATIONS

International Search Report of foreign counterpart Application No. PCT/EP2009/056580 mailed Aug. 31, 2009.

Zalis et al., "CT Colonography: Digital Subtraction Bowel Cleansing with Mucosal Reconstruction-initial Observations," Radiology, Oak Brook, IL, vol. 226, No. 3, Mar. 1, 2003, pp. 911-917.

Liang et al., "A Pilot Study on Less-Stressful Bowel Preparation for Virtual Colonoscopy Screening with Follow-up Biopsy by Optical Colonoscopy," Proceedings of SPIE vol. 5746, 2005; pp. 810-816.

Wang et al., "An Improved Electronic Colon Cleansing Method for Detection of Colonic Polyps by Virtual Colonoscopy," IEEE Trans Biomed Eng. Aug. 2006; 53(8), 1635-1646.

Summers et al., "Computer-Aided Detection of Polyps on Oral Contrast-Enhanced CT Colongraphy," AJR Jan. 2005; 184; pp. 105-108.

Zalis et al, "Digital Substraction Bowel Cleansing for CT Colonography Using Morphological and Linear Filtration Methods," IEEE Transactions on Medical Imaging, vol. 23, No. 11, Nov. 2004; pp. 1335-1343.

Chen et al., "Electronic Colon Cleansing by Colonic Material Tagging and Image Segmentation for Polyp Detection: Detection Model and Method Evaluation," IEEE, 2001; pp. 18-131-18-135.

Franaszek, et al., "Hybrid Segmentation of Colon Filled with Air and Opacified Fluid for Colonography," IEEE Transactions on Medical Imaging, vol. 25, No. 3, Mar. 2006; pp. 358-368.

Chen et al., "A Novel Approach to Extract Colon Lumen from CT Images for Virtual Colonoscopy," IEEE Transactions on Medical Imaging, vol. 19, No. 12, Dec. 2000, pp. 1220-1226.

Lakare et al., "3D Digital Cleansing Using Segmentation Rays," Visualization '00 Proceedings of the 11th IEEE 2000 Conference, Oct. 2000, pp. 37-44.

Cai et al., "Structure-based digital bowel cleansing for computer-aided detection of polyps in CT colonography," Int J CARS, 2006, 1:369-388.

* cited by examiner 701   702   703

ELECTRONIC CLEANSING OF DIGITAL DATA SETS

FIELD OF THE INVENTION

The present invention relates to electronic cleansing of a 3-dimensional electronic data set. Electronic (or digital) cleansing comprises post-acquisition processing of an electronic data set to "electronically" remove unwanted structures in the data set. In particular, the present invention relates to a method for the detection and removal of tagged materials or artifacts in 3-Dimensional Computed Tomography Colonography data sets.

BACKGROUND TO THE INVENTION

Computed Tomography Colonography (CTC) is a procedure whereby an accurate picture of the colon can be obtained from X-ray scan data. Images obtained by CTC are utilised to screen the colon for polyps or other abnormalities that could indicate a patient's risk to colon cancer or other colon diseases. CTC represents an increasingly popular alternative to traditional colonoscopy methods due to the minimally invasive nature of CTC. However, from a patient's point of view, one of the limitations of CTC is a requirement for rigorous bowel cleansing and preparation prior to scanning. Bowel cleansing is necessary to remove stool and other residual materials and fluids that could potentially obscure important features in the scan. The perceived inconvenience and discomfort associated with bowel preparation may act as a deterrent to an otherwise minimally invasive method of examining the colon.

Preparations for electronic cleansing provide a reliable and welcome alternative to conventional bowel cleansing. Prior to the CTC scan, the patient ingests an X-ray opaque contrast agent, which tags colonic fluids and stool. Methods of electronic cleansing aim to identify and remove the tagged materials from a 3-dimensional data set by electronic (post-acquisition) means. Thus, electronic cleansing provides a means of virtually removing stool and other fluids that could potentially obscure important features in the scan. As such, electronic cleansing of tagged material from the CTC data set represents a viable alternative to traditional physical cleansing. A number of prior art documents directed to electronic cleansing are discussed below.

Ordinarily, a CTC scan will assign an intensity value to a particular type of voxel (or 3-dim volume element), e.g. air will have a different intensity value to colon tissue, which will in turn have a different intensity value to tagged material. Simply classifying a voxel based on the range in which the intensity value of the voxel falls is complicated by Partial Volume effects and soft tissue erosion discussed below. U.S. Pat. Nos. 6,331,116, 6,343,936 and 6,514,082 discuss a method of electronic cleansing comprising classifying the data into voxel type on the basis of intensity values, similarity data, probability functions and feature vector analysis. High-level feature extraction is utilised to remove undesired tagged materials. Classification of voxels in a CTC data image based on intensity value is also disclosed in U.S. Pat. No. 6,477,401. Tagged material is edge expanded proportional to the intensity values of adjacent voxels and is ultimately removed.

Summers et al. (*AJR*, 2005, 184, 105-108) describe a segmentation algorithm utilising a very low threshold value for colonic fluid/tagged materials. To minimise leakage of tagged material into adjacent structures the air-fluid boundary is not permitted to exceed 2 voxels and an air region cannot be below a fluid region. By calculating the mean and standard deviation of the fluid intensity values a modified fluid threshold is determined, and a second segmentation procedure is performed to minimise leakage. Franaszek and Summers have also developed a more advanced hybrid segmentation algorithm (*IEEE Trans. Med. Imaging*, 2006, 25(3), 358-368). The method employs techniques such as region growing, fuzzy connectedness and Laplacian level set segmentation to improve the accuracy of the segmentation process.

A disadvantage associated with the processing of tagged CTC images is that at the boundary of different regions, e.g. air voxels and tagged material voxels, there are voxels whose intensities do not correspond to the intensity of either region and as such can be erroneously classified. These are referred to as partial volume voxels, and can comprise several layers of voxels. Methods addressing the problems associated with the incorrect classification of partial volume voxels are discussed in the prior art and a select few are communicated below.

Chen et al. (*IEEE Trans. Med. Imaging*, 2000, 19(12), 1220-1226) describe a segmentation approach to addressing the partial volume effect. Lakare et al. (*IEEE Visualization*, 2000, 37-44) developed a segmentation ray method comprising casting rays through the data set and scanning them for characteristic profiles that might indicate an air/tagged material interface. A statistical approach to partial-volume image segmentation utilising an expectation-maximization algorithm has been disclosed by Wang et al. (*IEEE Trans Biomed Eng.* 2006, 53(8), 1635-1646). A similar approach is communicated in WO 2007/064980 to account for the possibility that volume elements are capable of representing more than one material type. Statistical methods are utilised to generate a partial volume image model. Zalis et al. (*IEEE Trans. Med. Imaging*, 2004, 23(11), 1335-1343) communicated a method directed to addressing volume averaging artefacts that undesirably persist in a CTC scan once tagged fluid has been removed. Such volume averaging artefacts are due to air/tagged material partial volume voxels. Subtraction of this tagged material also results in a rapid transition in voxel intensity between boundary colonic tissue and subtracted intraluminal bowel contents and results in unwanted jagged edges in the processed image. The mucosal layer is reconstructed as a layer three pixels thick exhibiting a gradual decrease in voxel intensity from soft tissue to air. This publication is limited to mucosal reconstruction subsequent to over-subtraction of tagged material.

In addition to the problems associated with erroneous classification of partial volume voxels, removal of tagged material from a CTC data set can result in the erosion of soft-tissue structures partially covered by tagged colonic fluid. Incorrect removal of tagged material can lead to false positive polyp detection, or more seriously, missed polyps (false negative). Zalis and co-workers (*Int J. CARS* 2006, 1, 369-388; and WO2007/048091) further describe a method for the recovery of soft tissue structures submerged in or partially covered by tagged material utilising a morphological based approach. The method applies a Hessian operator matrix on a region of interest and the operator iteratively moves through the image. If the eigenvalues of the Hessian operator in a particular region of interest correspond to a predetermined signature of folds and/or polyps, the appropriate structure can be enhanced through mathematical operations prior to removal of the tagged bowel contents.

Notwithstanding the state of the art there remains a need for a method of electronic cleansing adapted to addressing the problems associated with erroneous removal of soft tissue structures submerged in or partially covered by tagged material. Furthermore, such a method would also be capable of circumventing the problems associated with mistaken classification on account of incorrect labelling of partial volume voxels.

SUMMARY OF THE INVENTION

In one aspect, the present invention provides for a method of processing a 3-dimensional Computed Tomography Colonography data set, comprising a plurality of voxels, to remove tagged material, the method comprising:
(i) classifying voxels in the data set as corresponding to air, tagged material or colon tissue, wherein each voxel lies within an associated intensity range;
(ii) identifying tagged material voxels at a colon tissue/tagged material interface having an intensity value below a predetermined intensity value;
(iii) applying an edge recovery algorithm to tagged material voxels identified in step (ii); and
(iv) selectively applying to the data set the output of the edge recovery algorithm of step (iii) to provide a plurality of edge recovered voxels.

The method may further comprise the steps of:
(v) reclassifying each edge recovered voxel as a colon tissue voxel; and
(vi) deleting tagged material voxels from the data set.

Alternatively, the present invention provides for a method of processing a 3-dimensional Computed Tomography Colonography data set, comprising a plurality of voxels, to remove tagged material, the method comprising:
(i) classifying voxels in the data set as corresponding to air, tagged material or colon tissue, wherein each voxel lies within an associated intensity range;
(ii) identifying tagged material voxels at a colon tissue/tagged material interface having an intensity value below a predetermined intensity value;
(iii) applying an edge recovery algorithm to tagged material voxels identified in step (ii);
(iv) selectively applying to the data set the output of the edge recovery algorithm of step (iii) to provide a plurality of edge recovered voxels;
(v) reclassifying each edge recovered voxel as a colon tissue voxel; and
(vi) deleting tagged material voxels from the data set.

Advantageously, the method of the present invention allows for recovery of important colon structures, which may be eroded or deleted due to their proximity to high valued tagged material voxels. Problems related to incorrect removal of tagged material such as false positive polyp detection, or more seriously, missed polyps (false negative) can be avoided.

Subsequent to deletion of the tagged material from the dataset, a polyp detection algorithm may be applied to the dataset. Computer Aided Detection (CAD) of polyps in the dataset can be achieved without any further processing of the dataset.

Within this specification the terms "voxel" and "volume element" are synonyms and are used interchangeably for the sake of clarity.

Floating particles or motion artifacts may sometimes cause an object to remain suspended in the colon after the tagged material has been removed. Thus, step (vi) of the method of the present invention may further comprise the steps of identifying all voxels belonging to the largest connected object in the data set (using a multi-scale approach to minimise processing time and computer memory requirements) and subsequently removing all voxels not connected to said largest connected object from the data set.

In particular, the method of the present invention may further comprise the steps of:
(vii) identifying colon tissue voxels adjacent to deleted tagged material voxels;
(viii) calculating a new intensity value for each colon tissue voxel identified in step (vii) as a function of the average colon tissue voxel intensity value;
(ix) applying a smoothing algorithm to the colon tissue voxels of step (viii); and
(x) labelling removed tagged material voxels as air voxels.

Additionally, this may comprise the step of:
(xi) labelling newly identified air/colon tissue boundary partial volume voxels as colon tissue voxels.

Alternatively, the method of the present invention may further comprise the steps of:
(vii) identifying colon tissue voxels adjacent to deleted tagged material voxels;
(viii) calculating a new intensity value for each colon tissue voxel identified in step (vii) as a function of the average colon tissue voxel intensity value;
(ix) applying a smoothing algorithm to the colon tissue voxels of step (viii);
(x) labelling removed tagged material voxels as air voxels; and
(xi) labelling newly identified air/colon tissue boundary partial volume voxels as colon tissue voxels.

The smoothing algorithm referred to in step (ix) above may comprise 3-dimensional Gaussian smoothing.

Step (i) of the method of the present invention, i.e. the step of classifying voxels, may further comprise identifying volume elements corresponding to air/tagged material (interface or) boundary partial volume voxels. The process of classifying volume elements corresponding to air/tagged material (interface or) boundary partial volume voxels may further comprise:
a) segmenting the image into discrete segments;
b) identifying voxels within a predefined distance from an air voxel and a tagged material voxel; and
c) defining the voxels identified in (b) as air/tagged material boundary partial volume voxels.

Additionally, this may comprise the step of:
d) expanding the region corresponding to tagged material voxels according to a pre-determined intensity value.

Alternatively, the process of classifying volume elements corresponding to air/tagged material (interface or) boundary partial volume voxels may further comprise:
a) segmenting the image into discrete segments;
b) identifying voxels within a predefined distance from an air voxel and a tagged material voxel;
c) defining the voxels identified in (b) as air/tagged material boundary partial volume voxels; and
d) expanding the region corresponding to tagged material voxels according to a pre-determined intensity value.

The air/tagged material partial volume boundary may be detected using an operator, which searches for the air/tagged material partial volume boundary in all directions. Unlike approaches described in the prior art, the operator does not work on the assumption that air voxels will always be above tagged material voxels.

In processing the above steps, the method of the present invention detects tagged material, and distinguishes it from similar high intensity bone voxels, by first detecting the air/tagged material interface points utilising a narrow thickness threshold. Desirably, voxels within 2 voxels distance from an air voxel (detected previously) and a high intensity value voxel (intensity value above +276 HU) comprise the air/ tagged material partial volume voxels. Initially employing a thicker threshold will increase the risk of accidental detection of bone.

To identify unclassified sections of air/tagged material (interface or) boundary partial volume voxels missed on account of the narrow thickness threshold utilised in the preceding steps, the method of classifying voxels corresponding to air/tagged material (interface or) boundary partial volume voxels may further comprise:

e) identifying voxels within a predefined distance from an air voxel and a tagged material voxel, wherein said predefined distance is greater than the predefined distance in step (b) above; and f) defining the voxels identified in step (e) as air/tagged material boundary partial volume voxels.

Additionally, this may comprise the step of:

g) deleting the voxels identified in step (f).

Alternatively, the method of classifying voxels corresponding to air/tagged material (interface or) boundary partial volume voxels may further comprise:

e) identifying voxels within a predefined distance from an air voxel and a tagged material voxel, wherein said predefined distance is greater than the predefined distance in step (b) above;

f) defining the voxels identified in step (e) as air/tagged material boundary partial volume voxels; and g) deleting the voxels identified in step (f).

The voxels corresponding to the air/tagged material (interface or) boundary partial volume voxels may be reclassified as air voxels. The reclassification may occur subsequent to deletion of the air/tagged material (interface or) boundary partial volume voxels.

Desirably, in step (e), any voxel which is within 7 voxels of the nearest colon air voxel (denote as A), and within 7 voxels of the nearest tagged material voxel (denote as B), wherein the sum of A and B is less than 10, is reclassified as an air/tagged material (interface) boundary partial volume voxel to be removed.

Step (ii) of the method of the present invention, i.e. identifying tagged material voxels at the colon tissue/tagged material interface having an intensity value below a predetermined intensity value, may comprise identifying those voxels with an intensity value below 600 Hounsfield units (HU).

Recovery of important colon structures, which may be eroded or deleted due to their proximity to high valued tagged material voxels, is a further aspect of the present invention. Incorrect removal of tagged material can lead to false positive polyp detection, or more seriously, missed polyps (false negative). Desirably, the edge recovery algorithm referred to in step (iii) above may comprise applying at least one Sobel edge operator to the data set. The identified tagged material voxels at the colon tissue/tagged material interface having an intensity value below a predetermined intensity value (e.g. 600 HU) are convolved with a sequence of 2-Dimensional horizontal and vertical Sobel edge operators. Preferably, the 2-Dimensional horizontal and vertical Sobel edge operators are orientated in the x-y, x-z and y-z axes of the data set.

Further desirably, the identified tagged material voxels at the colon tissue/tagged material interface having an intensity value below a predetermined intensity value (e.g. 600 HU) are convolved with three pairs of 2-Dimensional horizontal and vertical Sobel edge operators orientated in the x-y, x-z and y-z axes of the data.

A cartesian distance formula may be utilised to combine the outputs of each Sobel operator. The output of the edge recovery algorithm is applied to the data set if the Sobel operator returns a value in excess of a threshold value. The threshold value is calculated as a function of the median intensity value of the tagged material voxels.

Step (v) of the method of the present invention, i.e. reclassifying each edge recovered voxel as a colon tissue voxel, may comprise calculating a new intensity value for each edge recovered voxel. The new intensity value for each edge recovered voxel is calculated as a function of the output of the Sobel operator, the threshold value associated with the Sobel operator and the average colon tissue voxel intensity value.

In a further aspect, the present invention relates to a method of processing a 3-dimensional Computed Tomography Colonography data set, comprising a plurality of voxels, to remove tagged material, the method comprising:

(i) classifying voxels in the data set as corresponding to air, tagged material or colon tissue, wherein each voxel lies within an associated intensity range;

(ii) identifying colon tissue-tagged material partial volume voxels at a colon tissue/tagged material interface; and (iii) selectively reclassifying colon tissue-tagged material partial volume voxels at the colon tissue/tagged material interface as colon tissue voxels.

The method may additionally comprise the step of:

(iv) deleting tagged material voxels from the data set.

The deleted tagged material voxels may be reclassified as air voxels. Floating particles or motion artifacts may sometimes cause an object to remain suspended in the colon after the tagged material has been removed. Thus, step (iv) of the method of the present invention may further comprise the steps of identifying all voxels belonging to the largest connected object in the data set (using a multi-scale approach to minimise processing time and computer memory requirements) and subsequently removing all voxels not connected to said largest connected object from the data set.

Advantageously, the method of the present invention allows for recovery of important colon structures, which may be eroded due to their proximity to high valued tagged material voxels. Problems associated with incorrect removal of tagged material such as false positive polyp detection, or more seriously, missed polyps (false negative) can be avoided.

Subsequent to deletion of the tagged material from the dataset, a polyp detection algorithm may be applied to the dataset. Computer Aided Detection (CAD) of polyps in the dataset can be achieved without any further processing of the dataset.

The step of selectively reclassifying colon tissue-tagged material partial volume voxels at the colon tissue/tagged material interface as colon tissue voxels may comprise applying a neighbourhood operator to voxels. The operator may identify voxels having an intensity value greater than 200 Hounsfield units (HU) and reclassify the voxels as colon tissue voxels. Desirably, the operator may identify voxels having an intensity value of greater than 273 HU and reclassify the voxels as colon tissue voxels.

The colon tissue-tagged material partial volume voxels may form a boundary between the colon tissue and the tagged material. The step of selectively reclassifying voxels colon tissue-tagged material partial volume voxels as colon tissue voxels may comprise applying a neighbourhood operator to voxels within the defined boundary. The operator may identify voxels having an intensity value greater than 200 Hounsfield units (HU) and reclassify the voxels as colon tissue voxels. Desirably, the operator may identify voxels having an intensity value of greater than 273 HU and reclassify the voxels as colon tissue voxels.

The range of the operator may be restricted to the boundary defined by the colon tissue-tagged material partial volume voxels. The operator may be a 26 neighbourhood operator; i.e. the voxel to which the operator is applied and its 26 neighbouring voxels comprise a cube of dimension 3 voxels×3 voxels×3 voxels.

Reclassifying voxels within the boundary defined by the colon tissue-tagged material partial volume voxels as colon tissues voxels may comprise reclassifying those voxels having an intensity value greater than 200 Hounsfield units (HU) as colon tissue voxels. Desirably, those voxels having an intensity value of greater than 273 HU will be reclassified as colon tissue voxels.

The tagged material voxels deleted from the data set may be replaced with voxels corresponding to air. The voxels corresponding to air may have an intensity value of −800 HU to −1000 HU. Suitably, the voxels corresponding to air may have an intensity value of −1000 HU.

Step iv) may result in the formation of a colon tissue/deleted tagged material interface. The method of the present invention may further comprise the step of smoothing the voxels at the colon tissue/deleted tagged material interface. Smoothing the voxels may be achieved by applying a smoothing algorithm to the dataset. For example, by applying a 3-dimensional Gaussian smoothing algorithm.

The above method may further comprise the steps of:
v) applying an edge recovery algorithm to the reclassified voxels of step iii) above; and
vi) selectively applying to the data set the output of the edge recovery algorithm of step (v) to provide a plurality of edge recovered voxels.

Advantageously, such further processing steps may enhance visualisation of the dataset. For example, it may make the dataset more presentable to a diagnosing physician.

Desirably, the edge recovery algorithm referred to in step (v) above may comprise applying at least one Sobel edge operator to the data set. The edge recovery algorithm may comprise convolving the reclassified voxels of step iii) with a sequence of 2-Dimensional horizontal and vertical Sobel edge operators. Preferably, the 2-Dimensional horizontal and vertical Sobel edge operators are orientated in the x-y, x-z and y-z axes of the data set.

The edge recovery algorithm may comprise convolving the reclassified voxels of step iii) with three pairs of 2-Dimensional horizontal and vertical Sobel edge operators orientated in the x-y, x-z and y-z axes of the data. The Sobel operator may be a 26 neighbourhood operator in that the Sobel operator is applied to a voxel and its 26 neighbouring voxels so as to generate a cubic mask of dimension 3 voxels×3 voxels×3 voxels.

A Cartesian distance formula may be utilised to combine the outputs of each Sobel operator. The output of the edge recovery algorithm may be applied to the data set if the Sobel operator returns a value in excess of a threshold value. The threshold value may be calculated as a function of the median intensity value of the tagged material voxels.

Each edge recovered voxel may be reclassified as a colon tissue voxel. This may comprise calculating a new intensity value for each edge recovered voxel. The new intensity value for each edge recovered voxel may be calculated as a function of the output of the Sobel operator, the threshold value associated with the Sobel operator and the average colon tissue voxel intensity value.

The method of the present invention may further comprise identifying voxels in the data set corresponding to air/tagged material interface partial volume voxels. The voxels identified as corresponding to air/tagged material interface partial volume voxels may be reclassified as colon air voxels. Identifying voxels corresponding to air/tagged material interface partial volume voxels may comprise:
a) segmenting the image into discrete segments;
b) identifying voxels within a predefined distance from an air voxel and a tagged material voxel; and
c) defining the voxels identified in (b) as air/tagged material interface partial volume voxels.

With reference to the above steps, the method of the present invention detects tagged material, and distinguishes it from similar high intensity bone voxels, by first detecting the air/tagged material interface points utilising a narrow thickness threshold. Desirably, voxels within 2 voxels distance from an air voxel (detected previously) and a high intensity value voxel (intensity value above +276 HU) comprise the air-tagged material partial volume voxels. Initially employing a thicker threshold will increase the risk of accidental detection of bone.

To identify sections of air/tagged material interface partial volume voxels missed on account of the narrow thickness threshold utilised in steps a) to c), the method of classifying voxels corresponding to air/tagged material interface partial volume voxels may further comprise:
d) identifying voxels within a predefined distance from an air voxel and a tagged material voxel, wherein said predefined distance is greater than the predefined distance in step (b) above; and
e) defining the voxels identified in step (e) as air/tagged material interface partial volume voxels.

Desirably, in step (e) above, any voxel which is within 7 voxels of the nearest colon air voxel (denote as A), and within 7 voxels of the nearest tagged material voxel (denote as B), wherein the sum of A and B is less than 10, is reclassified as an air/tagged material interface partial volume voxel to be removed.

The invention is further directed to a processing means for performing the methods of the present invention and further extends to a computer readable medium having instructions, which when executed by a processor, performs the methods of the present invention.

It will be appreciated that the method of the present invention may be used for digital cleansing of a 3-dimensional Computed Tomography Colonography data set.

The invention further relates to a method as described herein and with reference to the accompanying drawings.

Where suitable, it will be appreciated that all optional and/or additional features of one embodiment of the invention may be combined with optional and/or additional features of another/other embodiment(s) of the invention.

BRIEF DESCRIPTION OF THE DRAWINGS

The present invention will now be described in greater detail with reference to the accompanying drawings, in which.

DETAILED DESCRIPTION OF THE INVENTION

Electronic cleansing provides a means of virtually removing stool and other residual materials and fluids that could potentially obscure important features in a CTC scan, and as such, electronic cleansing of tagged material from a CTC data set represents a viable alternative to traditional physical cleansing. Prior to electronic cleansing the patient is required to ingest a tagging material (typically containing barium), which strongly absorbs X-rays. Ideally, tagging material should be uniformly absorbed by the colon contents to allow easy differentiation with colon wall tissue, including polyps. However, tagging is often not uniform in practice, resulting in over- and under-tagged material in various sections of the bowel. Also, low imaging resolution results in the phenomenon of Partial Volume voxels (with intermediate intensity values) lying between tagged material (TM) and regions of air or colon. This complicates the task of digital removal of tagged material.

Figure 1:
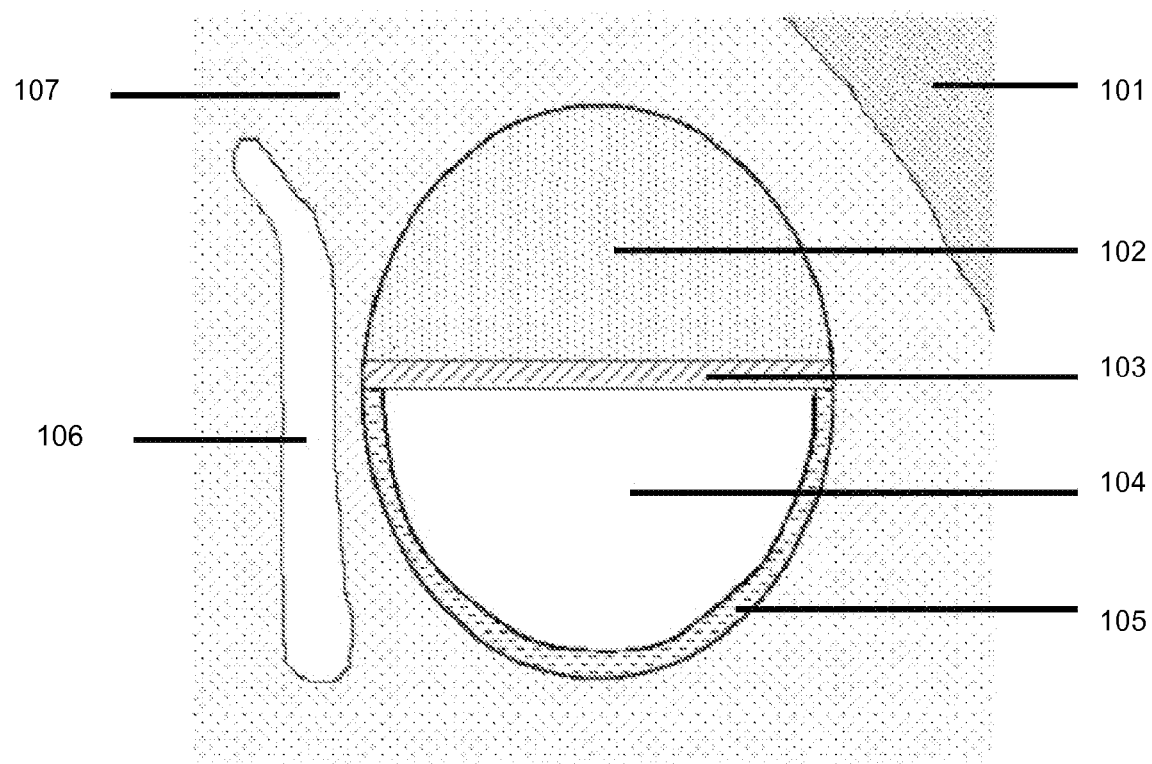
FIG. 1 is an illustration of a typical CTC colon section data set, partly filled with tagged material, processed by the method of the present invention.

When a CTC scan is performed in the presence of tagged material, the scan contains seven principle voxel regions. FIG. 1 illustrates these regions. At high voxel intensity values are sections of bone 106 and the special tagged material 104. At low intensity levels is air, both inside the colon 102 and outside the body 101, and also (not shown) air in the lungs and other body spaces. In the mid-range is colon tissue 107 and Partial Volume (PV) voxels with intensity values intermediate to neighbouring regions. Two types of partial volume voxels exist; air/tagged material (TM) partial volume voxels 103 and tagged material (TM)/colon tissue partial volume voxels 105. Preliminary processing performed prior to the electronic cleansing procedure of the present invention comprises segmenting the colonic air pockets and successfully excludes the lungs and air external to the body. The task is to completely remove all high intensity tagged material without altering the shape of the colon surface. However, the practicalities of the CT scan in the presence of tagged material cause difficult to detect secondary effects, such as blurring, partial volume voxels, motion artifacts and 'washed out' fine detail. Incorrect removal of tagged material can lead to false positive polyp detection, or more seriously, missed polyps (false negative).

Figure 2:
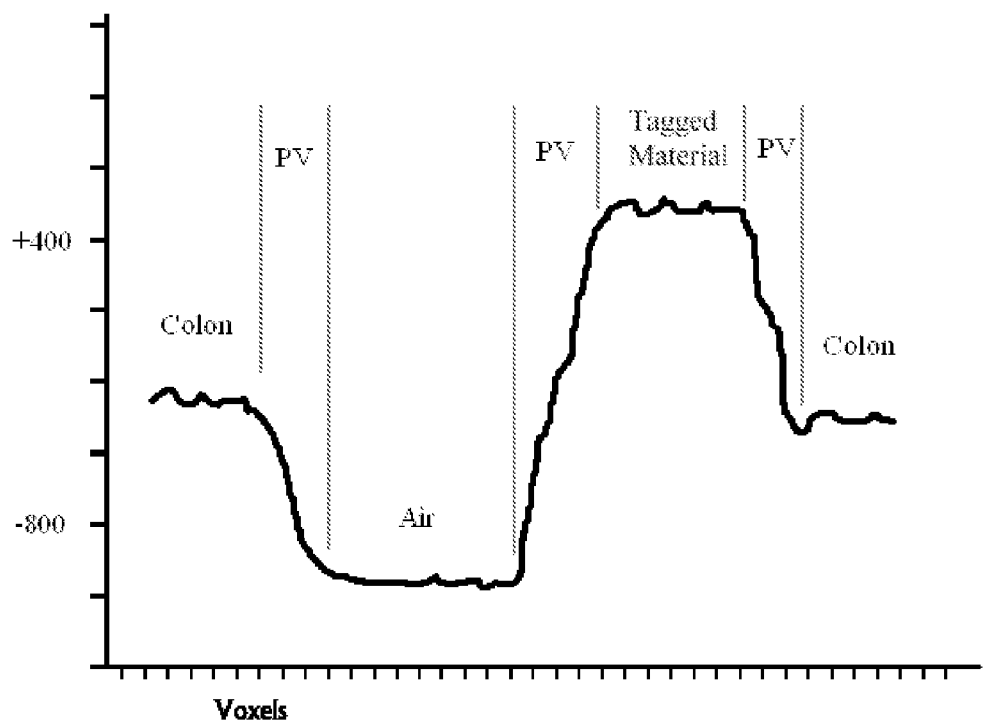
FIG. 2 is a cross section profile of a typical CTC colon data set, partly filled with tagged material.

FIG. 2 shows the intensity profile of a cross section of a colon partly filled with tagged material. On the extreme left and right is ordinary colon tissue. Colon tissue has an average intensity of around −100 HU (Hounsfield units); air generally has an intensity value below −800 HU while tagged material is above +400 HU. Partial Volume (PV) voxels, with intermediate intensity values, separate these regions. Between the colon tissue and the air or tagged material contents is a variable width of 2-10 Partial Volume voxels, some of which have intensity values in the region of colon tissue.

Tagged material is not the only high intensity value material to be found in tagged colon data. Bone exists within a similar (overlapping) intensity range, thus a way must be found to distinguish bone voxels from tagged material voxels. Prior art methods search for high valued voxels (possible tagged material), which are near to very low valued voxels (possible air) and then floodfill the tagged material region. However, due to low imaging resolution, a layer of 'partial volume' (PV) voxels separate regions of tagged material voxels and air voxels, with values intermediate to neighbouring regions. This PV layer may be between one and ten or more voxels thick. In some cases, the PV layer may be as wide as some thin sections of tissue separating bone from air.

Figure 3:
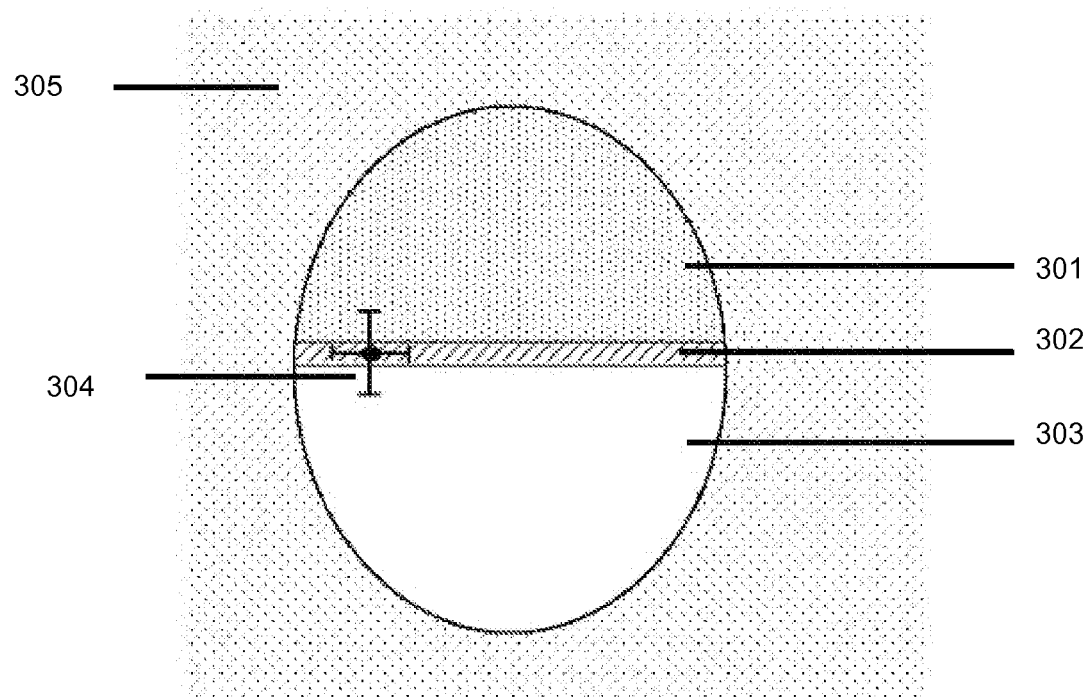
FIG. 3 shows detection of air/tagged material boundary by the method of the present invention.

An aim of the present invention is to detect the tagged material pockets, and to distinguish them from similar high intensity bone voxels, by first detecting the Air/TM interface points. This is achieved by Raster Scanning the volume data and locating points that are within 2 voxels distance from an air voxel (detected previously) and a high value voxel (intensity value above +276 HU). Raster Scanning comprises cutting an image into a plurality of strips. These points are used to seed the floodfill algorithm for the tagged material. FIG. 3 shows an illustration of a cross section of a colon containing a mixture of colon tissue 305, air 301 and tagged material 303—the method of the present invention is directed to reliable detection of the air/tagged material boundary. Low intensity air 301 is separated from high intensity tagged material 303 by an Air/TM boundary layer of Partial Volume voxels 302. This boundary is detected using a special operator 304. This operator searches for the Air/TM boundary in all directions, without assuming that air will always be above tagged material. This is in order to detect small pockets of tagged material which may be stuck to the colon walls. The prior art contains several variations on this approach to tagged material detection. Most use these same boundary points to also delete the Air/TM boundary itself but this can lead to problems because of the large variability in boundary thickness. Using a narrow thickness threshold (1-4 voxels) will result in sections of Air/TM boundary remaining while using a thicker threshold will increase the risk of accidental detection of bone.

The method of the present invention provides a two-stage removal process. First, a narrow threshold is used to find Air/TM boundary points. These are then used to seed a floodfill process to find tagged material pockets. It is not necessary to find every part of the Air/TM boundary at this stage. When the narrow thickness threshold has successfully found all the tagged material while avoiding bone, a second pass, with a larger thickness threshold, is made to remove the remaining Air/TM PV voxels. Some of the prior art assume a flat horizontal surface for tagged material. This assumption fails due to meniscus near the edges, when motion causes the level of the tagged material to change during scan, or when small amounts of tagged material are attached to the colon walls. The method of the invention described herein does not make this assumption. The second pass removes the Air/TM layer using a modified floodfill procedure, which is limited to a 'thin film' of voxels sandwiched between tagged material and air voxels. This allows more flexibility in the removal of curved and non-horizontal surfaces.

The above-mentioned second pass procedure to detect and remove all remaining air/TM boundary voxels comprises calculating the distances to the closest colon air voxel (as defined by the original colon segmentation in the incoming data set), and the closest tagged material voxel (as defined during the initial floodfill). Any voxel which is within 7 voxels of the nearest colon air voxel (denote as A), and within 7 voxels of the nearest tagged material voxel (denote as B), wherein A+B<10, is reclassified as an air/TM boundary voxel to be removed.

Subsequent steps comprise deletion of tagged material and recovery of important colon structures, which may be eroded due to their proximity to high valued tagged material. These are termed 'washed-out' features.

Figure 6:
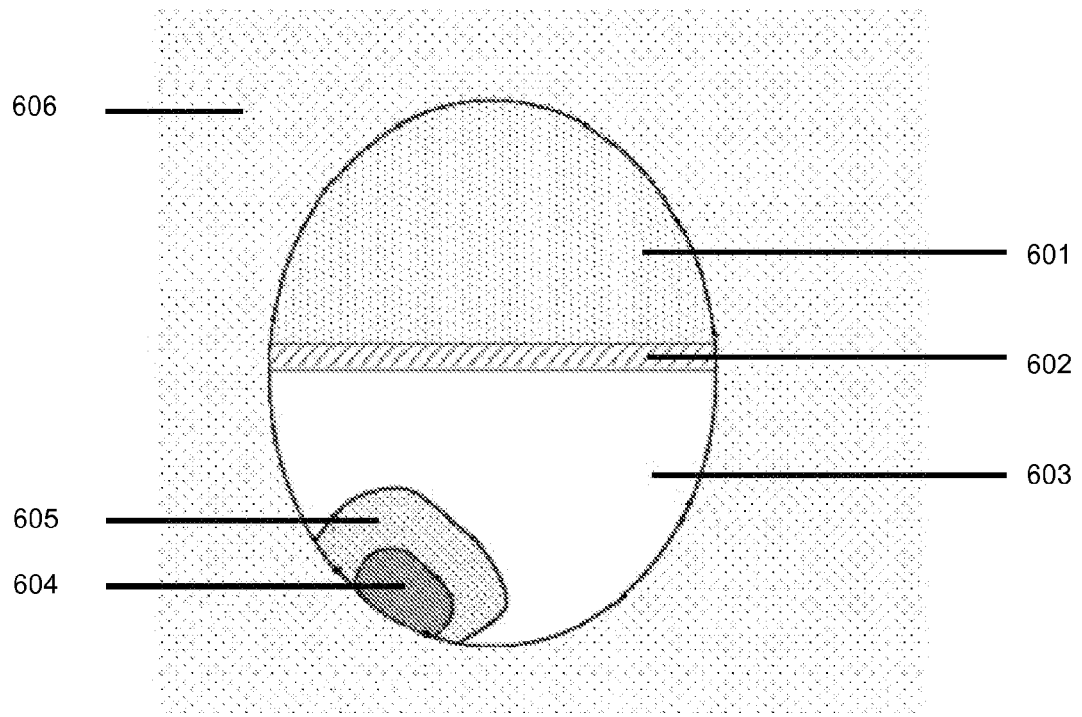
FIG. 6 is an illustration of the eroding effect of over-tagged material on neighbouring colon fine structure.

FIG. 6 illustrates the 'wash-out' effect, which results in an apparent reduction in the size of some submerged features. 604 Depicts the apparent size of a submerged feature whilst 605 illustrates the actual size of the structure occluded by the tagged material 603. Colon tissue 606, air 601, air/TM partial volume voxels 602 and tagged material 603 are also shown in the figure. In many cases this may result in the feature becoming disconnected from the colon wall or the complete loss of the feature.

The method of the present invention provides for an initial floodfill at a low threshold level (276 HU has been chosen with reference to Franaszek et al., 2006 [vide supra]), followed by an edge detection step to recover 'washed out' features. A 3D Sobel edge operator is used. The classic Sobel edge operator is extended to 3D by convolving the CT volume data with a sequence of three pairs of 2D horizontal and vertical operators, orientated in each axis of the data (x-y, x-z, y-z). A Cartesian distance formula is used to combine the outputs of each Sobel operator.

In an alternative aspect, the method of the present invention provides for an initial floodfill of tagged material at a low threshold level (273 HU), followed by selective reclassification of voxels as colon tissue voxels within a boundary defined by the colon tissue-tagged material partial volume voxels to recover 'washed out' features. A 26 neighbourhood operator is applied to the colon tissue-tagged material partial volume voxels at the interface of the tagged material and the colon tissue. The range of the operator is confined to a boundary defined by the colon tissue-tagged material partial volume voxels. Any voxels having HU value in excess of 273 are relabelled as colon tissue voxel. The process is named as morphological addition.

Figure 4:
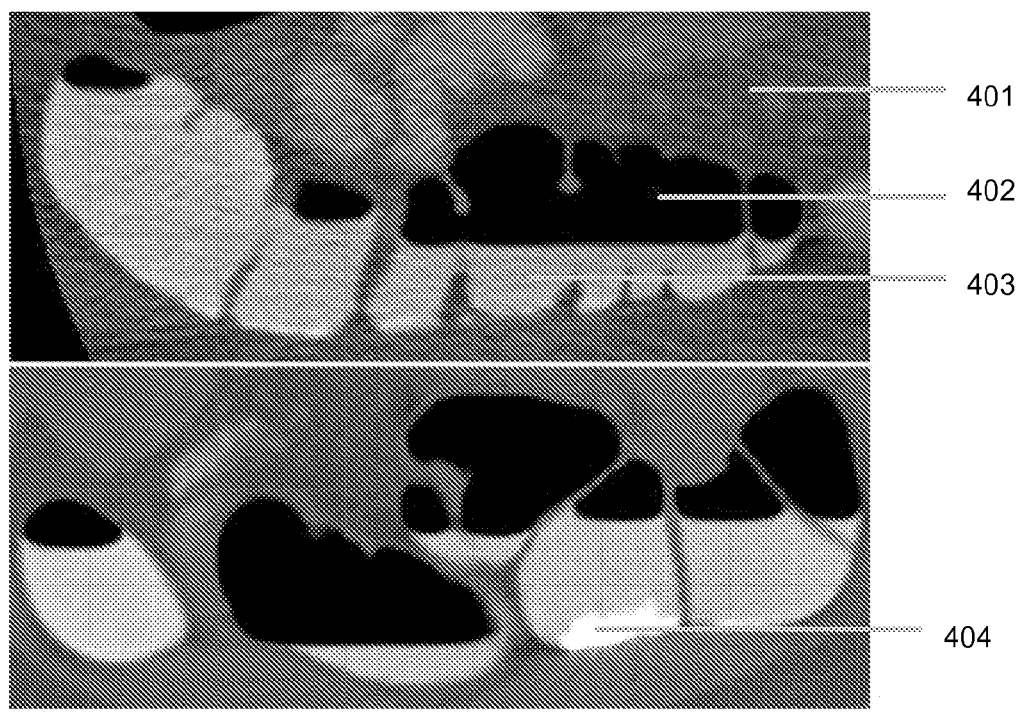
FIG. 4 shows examples of inconsistent tagging that the present invention attempts to address; (top) a combination of low tagging and scanning effects result in phantom texture; (below) a pocket of over-tagged material resulting in occlusion of features.

Variations in tagging consistency and intensity level sometimes results in a false 'texture'—phantom edges and details at high intensity values. In FIG. 4 examples of inconsistent tagging are depicted. In the top representation colon tissue 401, air 402 and tagged material 403 are labelled. A combination of low tagging and scanning effects result in phantom texture. The lower representation illustrates a pocket of over-tagged material resulting in occlusion of features 404. The present invention circumvents these problems in one of two ways.

Figure 5:
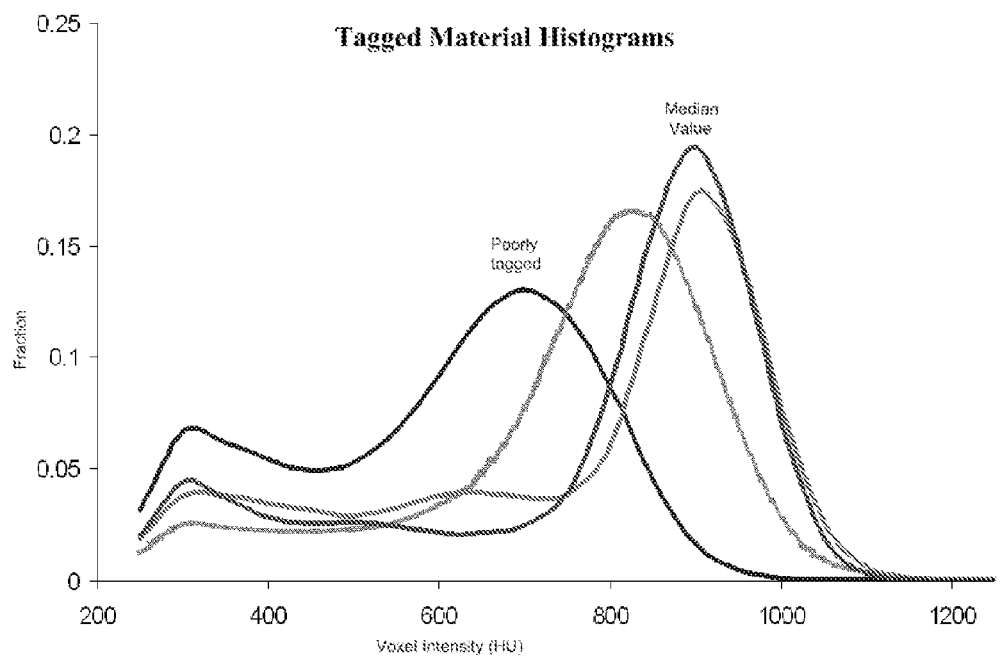
FIG. 5 shows examples of normalized histograms depicting average intensity values for tagged material in CTC data sets processed by the method of the invention.

In one aspect, the Sobel edge recovery procedure is only performed if at least one voxel in the Sobel neighbourhood is below a midlevel intensity value of 600 HU. Second, the edge is only recorded if the Sobel operator returns a value in excess of a threshold. This threshold is calculated using the median value of the histogram of the tagged material (1):

$$threshold = 1000 + \begin{cases} (900 - TMPeak) \times 10 & \text{if } TMPeak < 900 \\ 0 & \text{if } TMPeak \geq 900 \end{cases} \quad (1)$$

where 900 HU represents the usual value for the peak of the histogram for tagged material. Threshold is set to 1000 if the TM Peak is above 900 HU. FIG. 5 shows examples of typical histograms illustrating the average intensity of tagged material in the data sets. Histograms showing both good and poor tagging consistencies are plotted. Most data sets show a peak intensity value around 900 HU, with poorly tagged material having lower peak values. The recovered colon features are set to an intensity related to the average colon intensity level [(2) and (3)]:

$$SmoothingFactor = \frac{EdgeOutput - threshold}{threshold} \quad (2)$$

$$ColonVoxel = 100 \times SmoothingFactor + AverageColon - 400 \quad (3)$$

The final steps of the method of the invention comprise detecting all colon voxels which are beside recently removed tagged material voxels. As can be seen in FIG. 2, these PV voxels slope upwards in intensity from the colon level to the high level of tagged material. The aim of this step is to adjust this profile to appear like the Colon/Air PV voxels, i.e. to slope down from colon to the air level. This is achieved by inverting these Colon/TM voxels around the average colon intensity value (4):

$$NewValue = AverageColon - OldValue \quad (4)$$

This is followed by a 3D Gaussian smoothing step and a final relabeling of all former tagged material voxels as air and all new Air/Colon boundary voxels as colon wall.

In a second aspect, the present invention provides for "morphological addition" as described supra to recover 'washed out' features. The 26 neighbourhood operator returns and reclassifies a plurality of voxels as colon tissue voxels based on the selection criteria disclosed above. All other tagged mater is deleted and marked with air voxel intensity from −800 HU to −1000 HU. 3-Dimensional Gaussian Smoothing can be applied to the colon tissue/deleted tagged material interface. At this stage, computer Aided Dectection (CAD) based polyp detection methods can applied to the dataset.

The dataset generally requires further processing for 3D visualization of the patient data by a physician. A Sobel edge recovery procedure is applied to further process the data prior to visualization. A 3D Sobel edge operator is used. The classic Sobel edge operator is extended to 3D by convolving the CT volume data with a sequence of three pairs of 2D horizontal and vertical operators, orientated in each axis of the data (x-y, x-z, y-z). A Cartesian distance formula is used to combine the outputs of each Sobel operator.

The Sobel recovery procedure is performed on the colon tissue/deleted tagged material interface and its neighbourhood voxels, i.e. the Sobel operator is a 26 neighbourhood operator in that the Sobel operator is applied to a voxel and its 26 neighbouring voxels so as to generate a cubic mask of dimension 3 voxels×3 voxels×3 voxels.

The edge is only recorded if the Sobel operator returns a value in excess of a threshold. This threshold is calculated using the median value of the histogram of the tagged material (1):

$$threshold = 1000 + \begin{cases} (900 - TMPeak) \times 10 & \text{if } TMPeak < 900 \\ 0 & \text{if } TMPeak \geq 900 \end{cases} \quad (1)$$

where 900 HU represents the usual value for the peak of the histogram for tagged material. Threshold is set to 1000 if the TM Peak is above 900 HU. FIG. 5 shows examples of typical histograms illustrating the average intensity of tagged material in the data sets. Histograms showing both good and poor tagging consistencies are plotted. Most data sets show a peak intensity value around 900 HU, with poorly tagged material having lower peak values. The recovered colon features are set to an intensity related to the average colon intensity level [(2) and (3)]:

$$SmoothingFactor = \frac{EdgeOutput - threshold}{threshold} \quad (2)$$

$$ColonVoxel = 100 \times SmoothingFactor + AverageColon - 400 \quad (3)$$

The final steps of the method of the invention comprise detecting all colon voxels which are beside recently removed tagged material voxels. As can be seen in FIG. 2, these PV voxels slope upwards in intensity from the colon level to the high level of tagged material. The aim of this step is to adjust this profile to appear like the Colon/Air PV voxels, i.e. to slope down from colon to the air level. This is achieved by inverting these Colon/TM voxels around the average colon intensity value (4):

$$NewValue = AverageColon - OldValue \quad (4)$$

This is followed by a 3D Gaussian smoothing step and a final relabeling of all former tagged material voxels as air and all new Air/Colon boundary voxels as colon wall.

Figure 7:
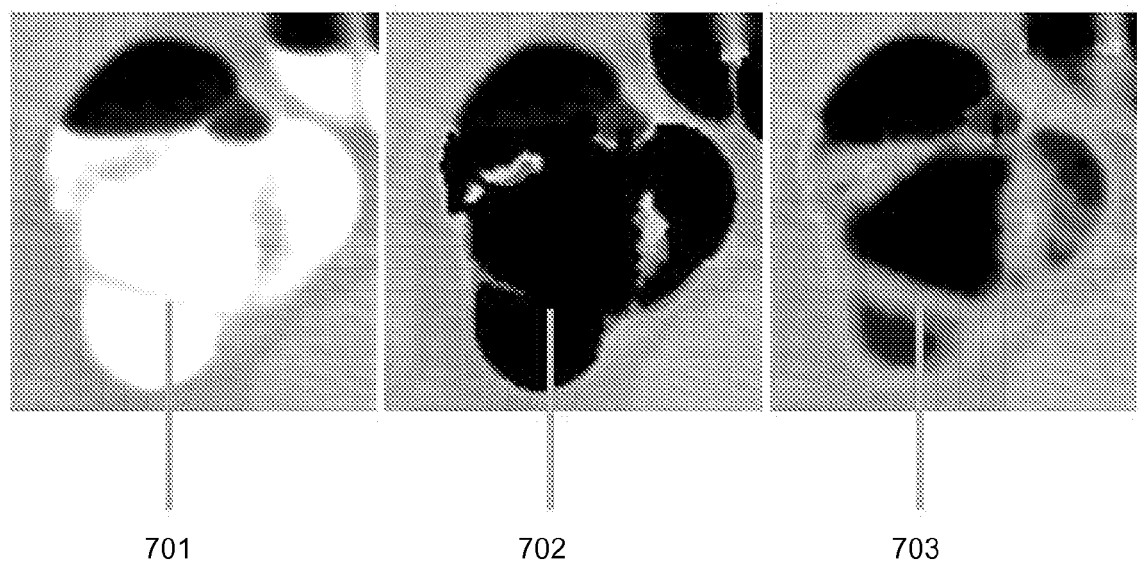
FIG. 7 shows an example of 'washed-out' colon features due to over-tagged neighbouring material: original data (left); result of floodfill tagged material removal (centre); and result of Sobel feature recovery (right) as described by the method of the present invention.

FIG. 7 illustrates 'washed-out' colon features due to over-tagged neighbouring material. The image to the far left 701 is the original CTC data set. The centre image 702 depicts the result of floodfill tagged material removal. The far right image is the result of successful Sobel feature recovery 703 provided by the method of the present invention. From 703 and 702 it is evident that a number of features eroded due to their proximity to high valued tagged material would have been erroneously deleted, had the Sobel feature recovery step not been performed.

Floating particles or motion artifacts may sometimes cause an object to remain suspended in the colon after the tagged material has been removed. These disconnected voxels are removed from the data set. First all voxels belonging to the largest connected object (i.e. the colon) in the data set are identified (using a multi-scale approach to minimise processing time and computer memory requirements) followed by removal of all disconnected voxels.

Figure 8:
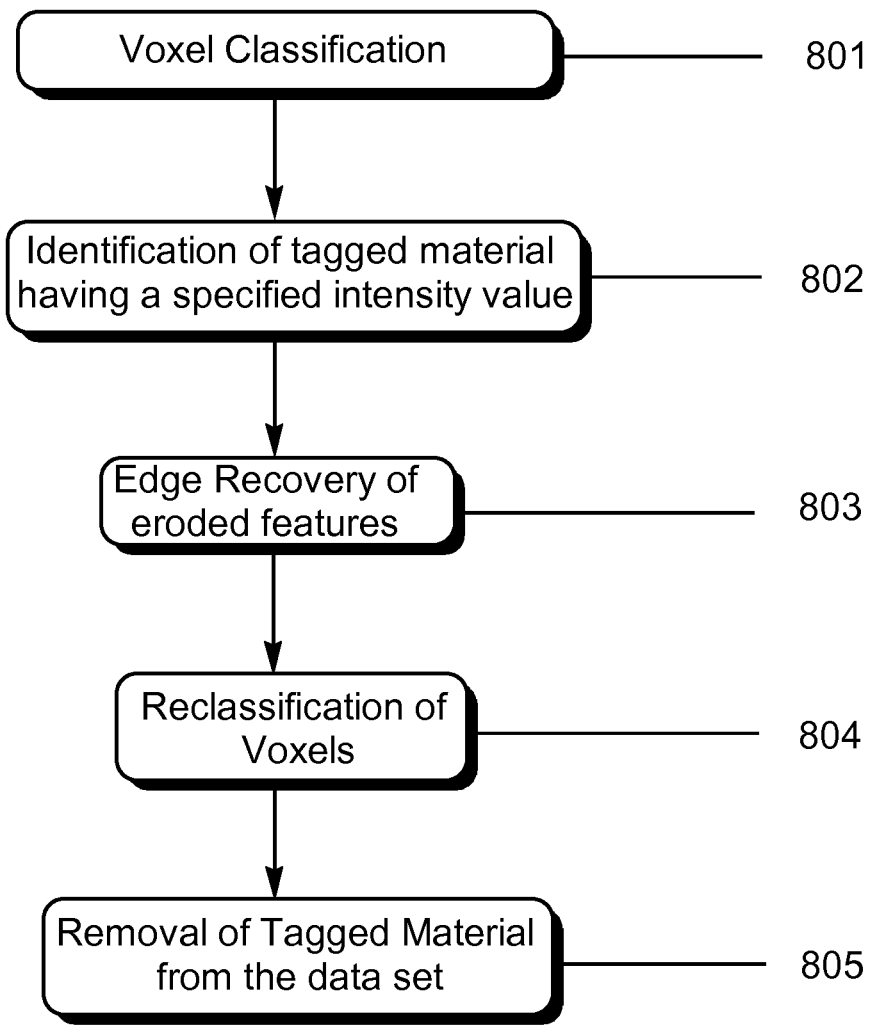
FIG. 8 is a schematic of one aspect of the present invention.

FIG. 8 illustrates one aspect of the present invention as a flow chart representation. Voxel classification 801 comprises grouping voxels into categories, e.g. air voxels, tagged material voxels, colon tissue voxels, etc., based on characteristic intensity values. In 802 tagged material voxels, at the boundary of the colon tissue voxels, having a specific intensity value range are identified. These volume elements identified in 802 are subjected to an edge recovery step 803—the output of the edge recovery is selectively applied to the data set as described in detail above. Due to "over-tagging", colon tissue features recovered utilising the edge recovery procedure 803 are reclassified as colon tissue voxels according to the method of the present invention 804. Voxels corresponding to tagged material are identified and removed from the data set 805.

In comparison to the prior art, the method of the present invention deals with all the issues and difficulties discussed above. It solves each of these using innovative and robust techniques. Primarily, the inventive method offers solutions to the problems of bone leakage while successfully removing all Air/TM boundary voxels and recovery of important eroded, or 'washed-out' features. The algorithm is relatively computationally inexpensive, taking about 2-3 minutes per data set. The method of the invention offers novel and robust methods to perform electronic cleansing. The method has been rigorously tested on 100 data sets. The results of these tests show the method successfully cleanses the colon of tagged material causing a low false positive (FP) rate of 3 FP per patient and a false negative (FN) rate of below 0.1 FN per patient. These results compare favourably with those published in the literature.

Figure 9:
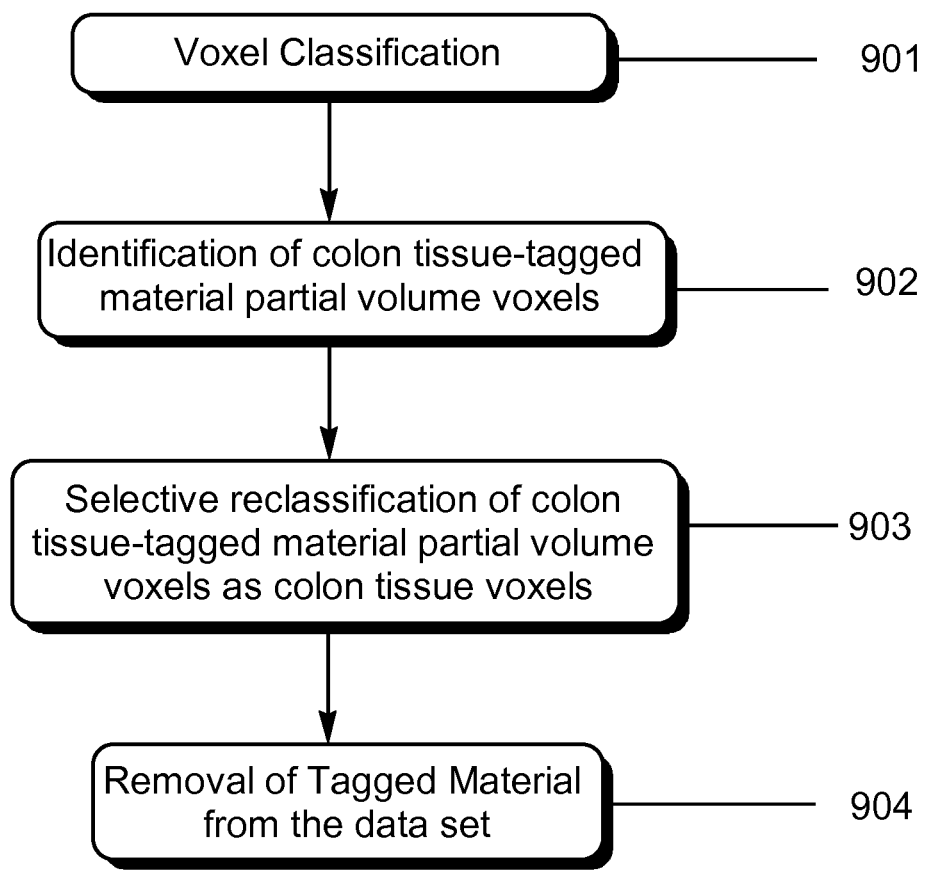
FIG. 9 is a schematic of a further aspect of the present invention.

FIG. 9 illustrates a further aspect of the present invention schematically. Voxel classification 901 comprises grouping voxels into categories, e.g. air voxels, tagged material voxels, colon tissue voxels, etc., based on characteristic intensity values. In 902 those voxels comprising partial volume voxels at the colon tissue/tagged material interface are identified. In step 903 the partial volume voxels identified in 902 are selectively reclassified as colon tissue voxels utilising the morphological addition approach set out in detail above. Voxels corresponding to tagged material are identified and removed from the data set 904.

The algorithm detailed in FIG. 9 is relatively computationally inexpensive, taking about 2-3 minutes per data set. The method of the invention offers novel and robust steps for perform electronic cleansing. The method has been rigorously tested on 483 data sets, 256 of which corresponded to actual patient data. The results of these tests show the method successfully cleanses the colon of tagged material with a low false positive (FP) rate of 2.98 FP per dataset. In addition, when combined with a CAD-polyp detection algorithm, sensitivities for polyps of in the range of 6 to 9 mm or greater than or equal to 10 mm are 89.79% and 97.43% respectively. These results compare favourably with those published in the literature.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A method of processing a 3-dimensional Computed Tomography Colonography data set, comprising a plurality of voxels, to remove tagged material, the method comprising:
   (i) classifying voxels in the data set as corresponding to air, tagged material or colon tissue, wherein each voxel lies within an associated intensity range;
   (ii) identifying tagged material voxels at a colon tissue/ tagged material interface having an intensity value below a predetermined intensity value;
   (iii) applying an edge recovery algorithm to tagged material voxels identified in step (ii); and
   (iv) selectively applying to the data set the output of the edge recovery algorithm of step (iii) to provide a plurality of edge recovered voxels.

2. The method of claim 1 further comprising the steps of:
   (v) reclassifying each edge recovered voxel as a colon tissue voxel; and
   (vi) deleting tagged material voxels from the data set.

3. The method of claim 1 further comprising the steps of:
   (vii) identifying colon tissue voxels adjacent to deleted tagged material voxels;
   (viii) calculating a new intensity value for each colon tissue voxel identified in step (vii) as a function of the average colon tissue voxel intensity value;

(ix) applying a smoothing algorithm to the colon tissue voxels of step (viii); and (x) labelling removed tagged material voxels as air voxels.

4. The method of claim 1 wherein the step of classifying voxels in the data set comprises identifying voxels corresponding to air/tagged material boundary partial volume voxels, which comprises:

a) segmenting the image into discrete segments;
b) identifying voxels within a predefined distance from an air voxel and a tagged material voxel; and
c) defining the voxels identified in (b) as air/tagged material boundary partial volume voxels.

5. The method of claim 4 further comprising the step of d) expanding the region corresponding to tagged material voxels according to a predetermined intensity value.

6. The method of claim 4 further comprising:

e) identifying voxels within a predefined distance from an air voxel and a tagged material voxel, wherein said predefined distance is greater than the predefined distance in step (b) of claim 4; and
f) defining the voxels identified in step (e) as air/tagged material boundary partial volume voxels.

7. The method of claim 1 wherein the step of applying the edge recovery algorithm comprises applying at least one Sobel edge operator.

8. The method of claim 7 wherein a Cartesian distance formula is utilised to combine the outputs of each Sobel operator and optionally wherein the output of the edge recovery algorithm is applied to the data set if the Sobel operator returns a value in excess of a threshold value.

9. The method of claim 1 further comprising the step of applying a polyp detection algorithm to the data set.

10. A method of processing a 3-dimensional Computed Tomography Colonography data set, comprising a plurality of voxels, to remove tagged material, the method comprising:

(i) classifying voxels in the data set as corresponding to air, tagged material or colon tissue, wherein each voxel lies within an associated intensity range;
(ii) identifying colon tissue-tagged material partial volume voxels at a colon tissue/tagged material interface; and
(iii) selectively reclassifying colon tissue-tagged material partial volume voxels at the colon tissue/tagged material interface as colon tissue voxels.

11. The method of claim 10 further comprising the step of:

(iv) deleting tagged material voxels from the data set; and optionally (v) smoothing the colon tissue voxels subsequent to deleting tagged material voxels.

12. The method of claim 11 further comprising the steps of:

v) applying an edge recovery algorithm to the colon tissue-tagged material partial volume voxels selectively reclassified as colon tissue voxels; and
vi) selectively applying to the data set the output of the edge recovery algorithm of step (v) to provide a plurality of edge recovered voxels.

13. The method of claim 12 wherein the step of applying the edge recovery algorithm comprises applying at least one Sobel edge operator to the data set.

14. The method of claim 13 wherein a Cartesian distance formula is utilised to combine the outputs of each Sobel operator and optionally wherein the output of the edge recovery algorithm is applied to the data set if the Sobel operator returns a value in excess of a threshold value.

15. The method of claim 10 wherein the colon tissue-tagged material partial volume voxels form a boundary between the colon tissue and the tagged material and the step of selectively reclassifying the colon tissue-tagged material partial volume voxels as colon tissue voxels comprises applying a neighborhood operator to voxels within said boundary.

16. The method of claim 10 wherein the step of classifying voxels in the data set comprises identifying voxels corresponding to air/tagged material interface partial volume voxels, which comprises:

a) segmenting the image into discrete segments;
b) identifying voxels within a predefined distance from an air voxel and a tagged material voxel; and
c) defining the voxels identified in (b) as air/tagged material interface partial volume voxels.

17. The method of claim 16 further comprising:

d) identifying voxels within a predefined distance from an air voxel and a tagged material voxel, wherein said predefined distance is greater than the predefined distance in step (b) above; and
e) defining the voxels identified in step (e) as air/tagged material interface partial volume voxels.

18. The method of claim 17 wherein the identified air/tagged material interface partial volume voxels are reclassified as air voxels.

19. The method of claim 10 further comprising the step of applying a polyp detection algorithm to the data set.

* * * * *